Jan. 8, 1935.  J. BEDFORD  1,987,251
HYDRAULIC VARIABLE TRANSMISSION MECHANISM
Filed Nov. 20, 1931  9 Sheets-Sheet 2

J. Bedford
INVENTOR

Jan. 8, 1935.   J. BEDFORD   1,987,251
HYDRAULIC VARIABLE TRANSMISSION MECHANISM
Filed Nov. 20, 1931    9 Sheets-Sheet 3

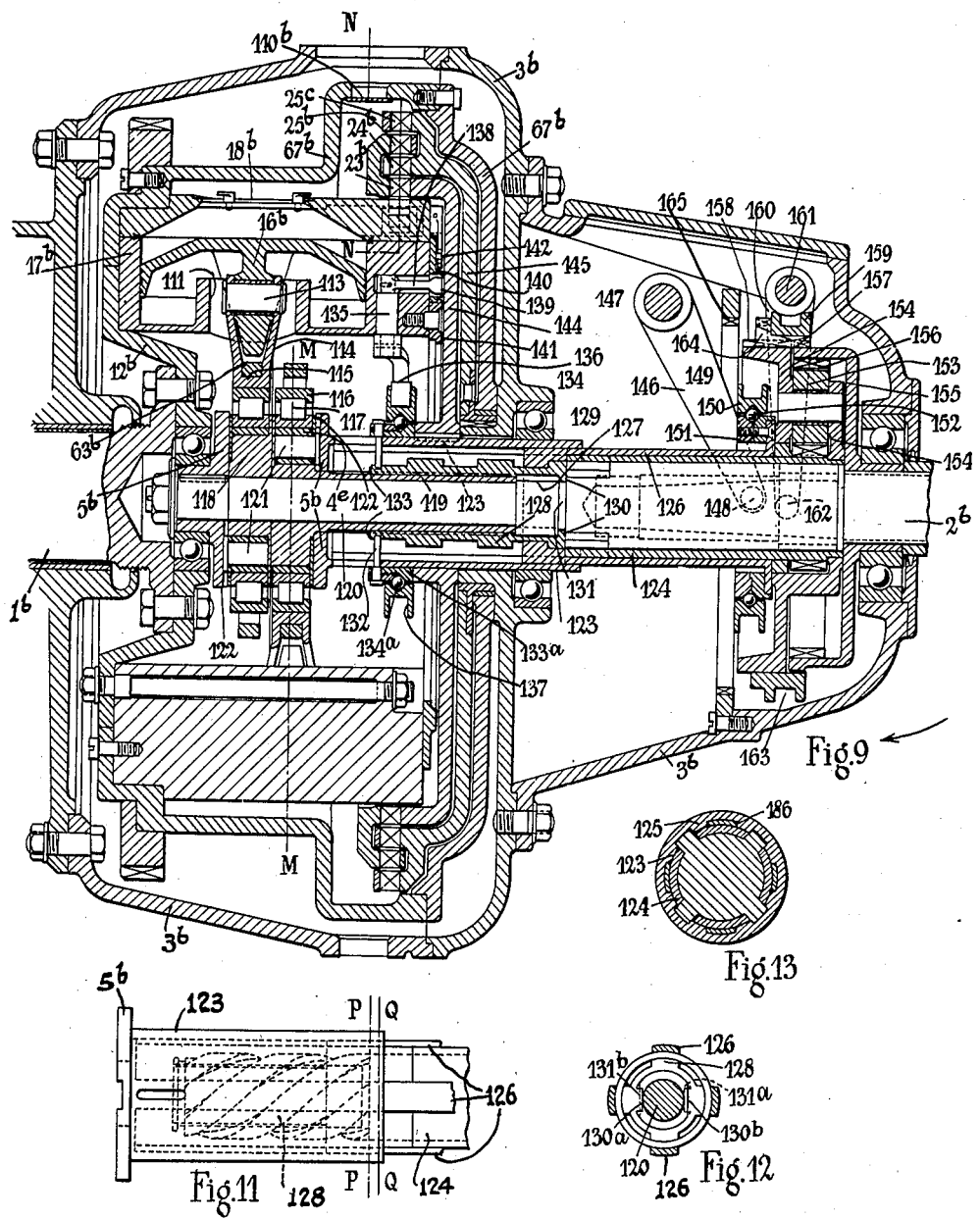

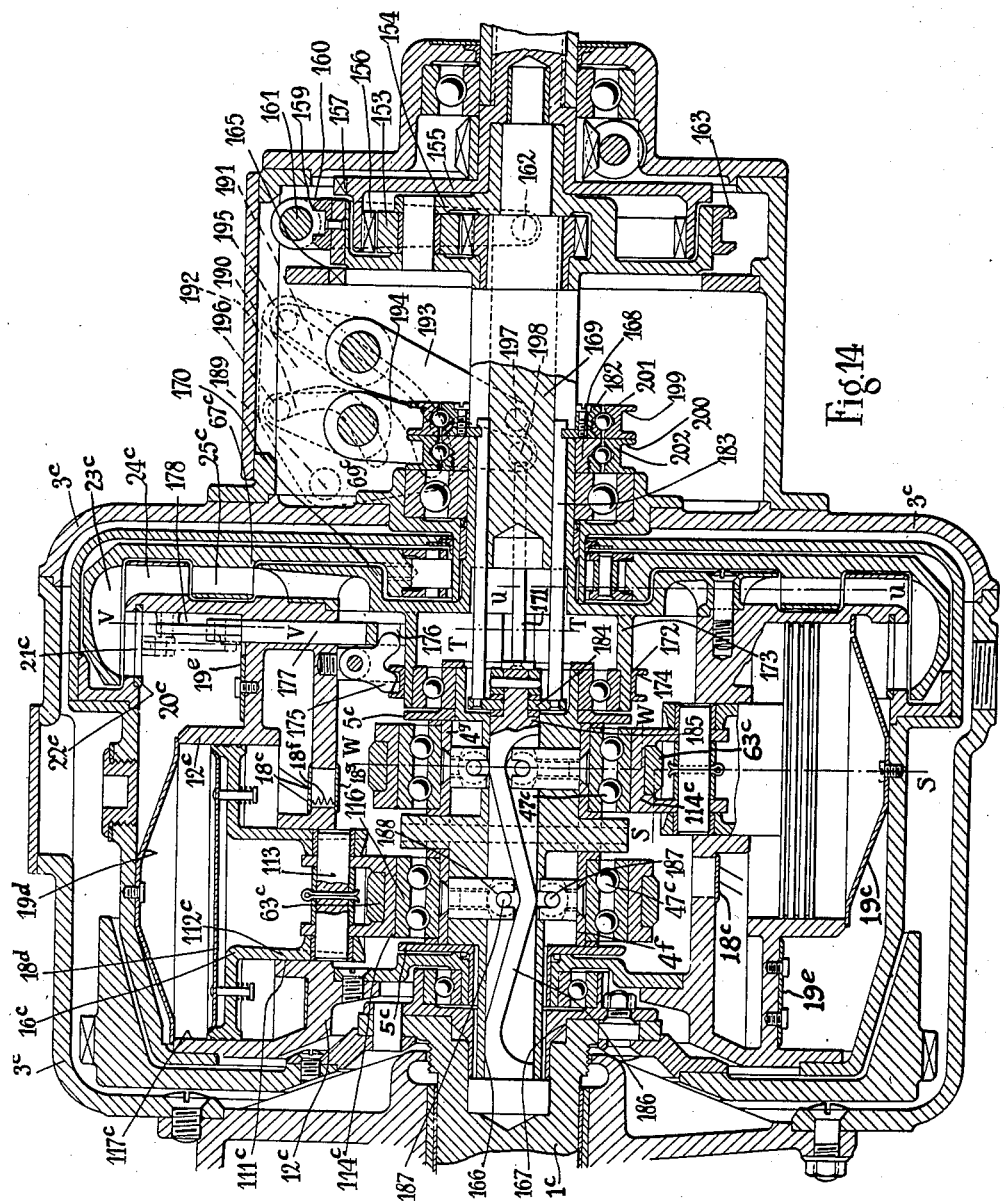

Jan. 8, 1935.   J. BEDFORD   1,987,251
HYDRAULIC VARIABLE TRANSMISSION MECHANISM
Filed Nov. 20, 1931   9 Sheets-Sheet 9

J. Bedford INVENTOR
By Marks & Clerk ATTYS.

Patented Jan. 8, 1935

1,987,251

UNITED STATES PATENT OFFICE 1,987,251

HYDRAULIC VARIABLE TRANSMISSION MECHANISM

Jesse Bedford, Luton, England, assignor of one-half to Matthew Clough Park, Luton, England Application November 20, 1931, Serial No. 576,365
In Great Britain December 23, 1930

10 Claims. (Cl. 60—54)

This invention relates to hydraulic variable transmission mechanism of the kind wherein, generally stated, transmission is effected through the operation of one or more pistons working in a cylinder or cylinders so as to produce a circulation of fluid which acts upon a system of vanes or the like.

In particular the invention relates to hydraulic variable transmission mechanism of the kind covered by the United States Patent No. 1,952,354 and the British Patent No. 352,034 and has for its object to provide improvements in such apparatus.

The invention has for its main objects, in connection with apparatus of the above kind:—

(a) To provide a more effective flow or transition of fluid and at the same time limit the displacement of the fluid to a minimum;

(b) To provide means whereby the return of the fluid to recharge the cylinders is accomplished as easily as possible;

(c) To minimize internal mechanical friction;

(d) To simplify and facilitate the control of the mechanism and to give improved strength and rigidity to same;

(e) To provide for a balanced and uniform discharge of the working fluid under all conditions and to arrange so that the discharge is rendered less dependent upon the variable motion of the pistons as the number of cylinders is increased, and (f) To provide alternative means for obtaining a reverse drive and to provide for the obtaining of an entirely free or neutral condition if desired.

Other objects of the invention will be apparent from the description given hereafter.

The invention accordingly comprises apparatus of the above kind embodying a plurality of vane rings.

The invention also comprises apparatus of the above kind having vanes attached alternately to stationary and moving parts of the gear.

The invention further comprises apparatus according to the preceding paragraphs wherein each vane is designed to turn the working fluid through substantially 180° so that the working fluid is caused to travel over a sinuous path in passing through the vane rings.

Further features of the invention will be hereafter described or indicated.

In the accompanying drawings:—

Figure 9 is a sectional side elevation of a further form of gear in accordance with the invention taken on the line L—L of Figure 10;

Figure 11 is an elevation of part of the control mechanism provided in this last form of gear;

Figures 12 and 13 are sectional end elevations of the part of the control mechanism illustrated in Figure 11 taken respectively on the lines P—P, Q—Q of that figure;

Figure 14 is a sectional side elevation of still a further form of gear in accordance with the invention taken on the line R—R of Figure 15;

In the following description like reference numerals are used throughout to denote like parts of the gears.

Figure 1:
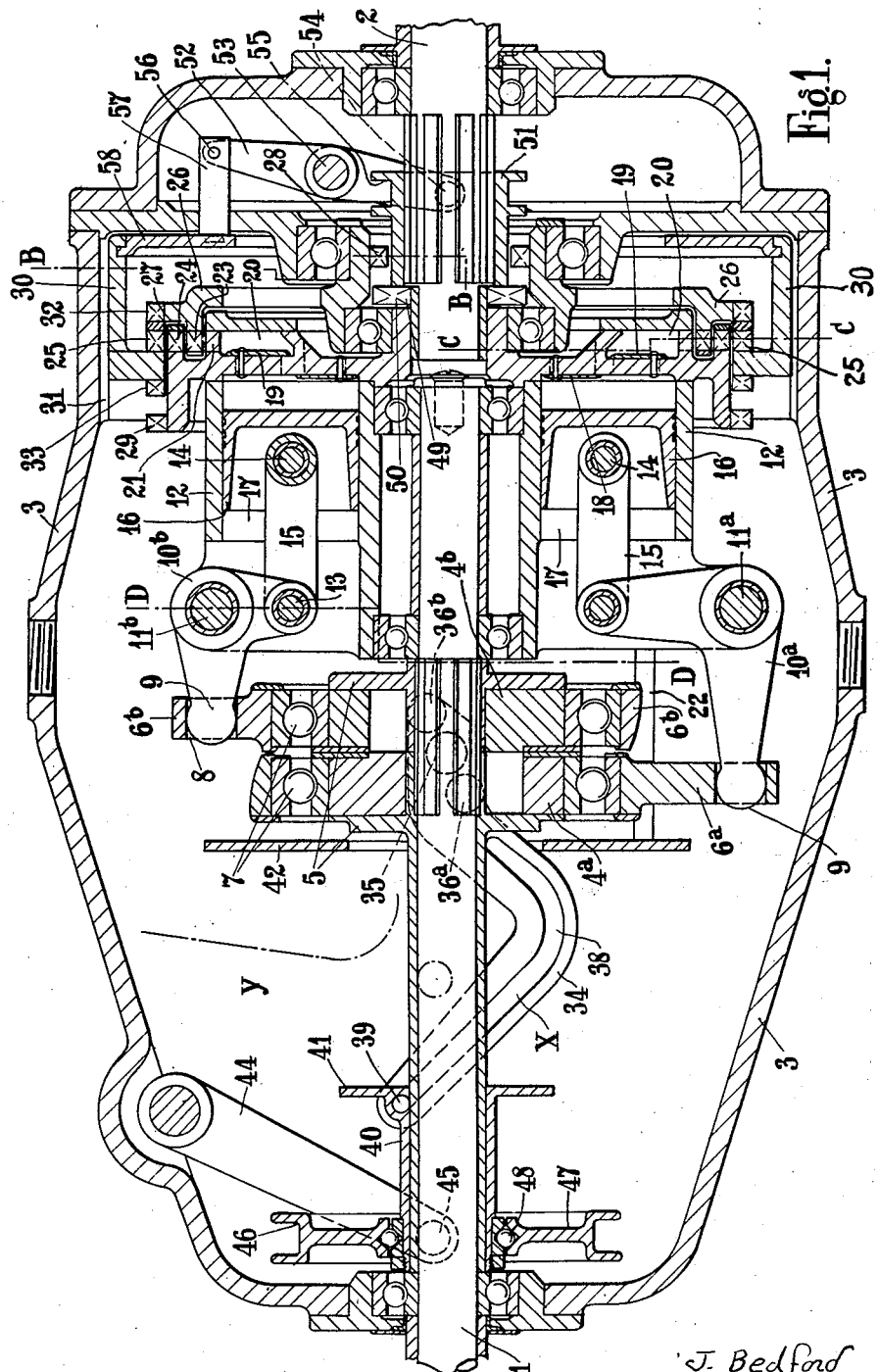
Figure 1 is a sectional side elevation of one form of gear in accordance with the invention taken on the line A—A of Figure 2.
Figure 2:
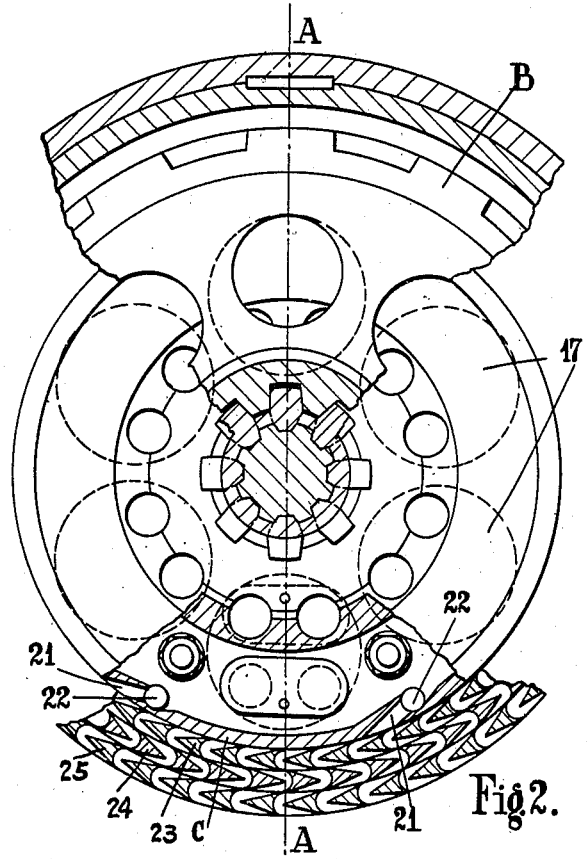
Figure 2 is a sectional end elevation of this form of gear of which the portion B is a section taken on the line B—B of Figure 1 and the portion C is a section taken on the line C—C of Figure 1.
Figure 7:
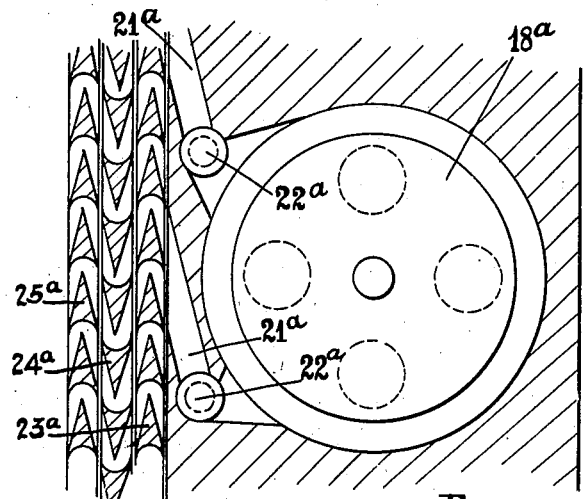
Figure 7 is a sectional plan of part of this latter form of gear taken on the line H—H of Figure 5 showing vanes and jets arranged in accordance with the invention.
Figure 3:
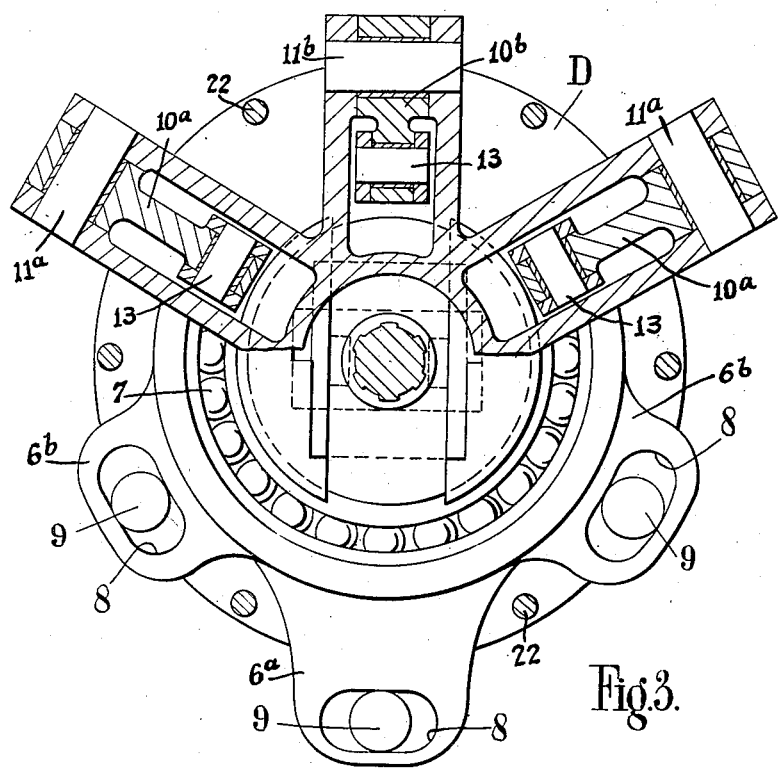
Figure 3 is a part sectional end elevation of this form of gear of which the portion D is a section taken on the line D—D of Figure 1.
Figure 8:
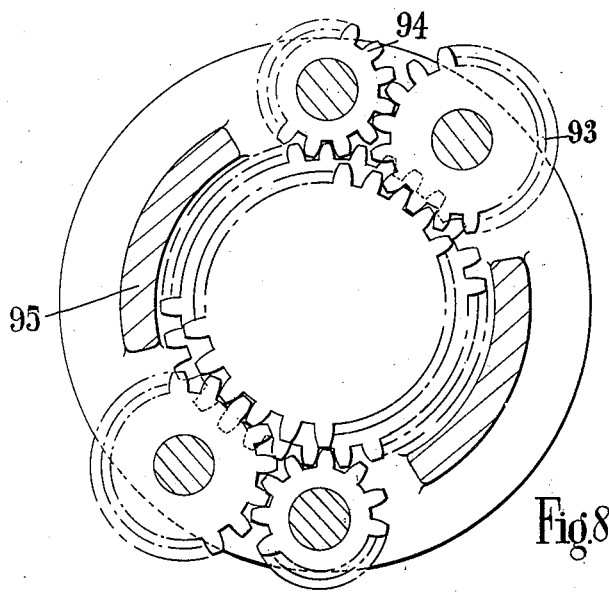
Figure 8 is a diagrammatic end sectional view taken on the line K—K of Figure 5 of reverse mechanism embodied in this latter form of gear.
Figure 6:
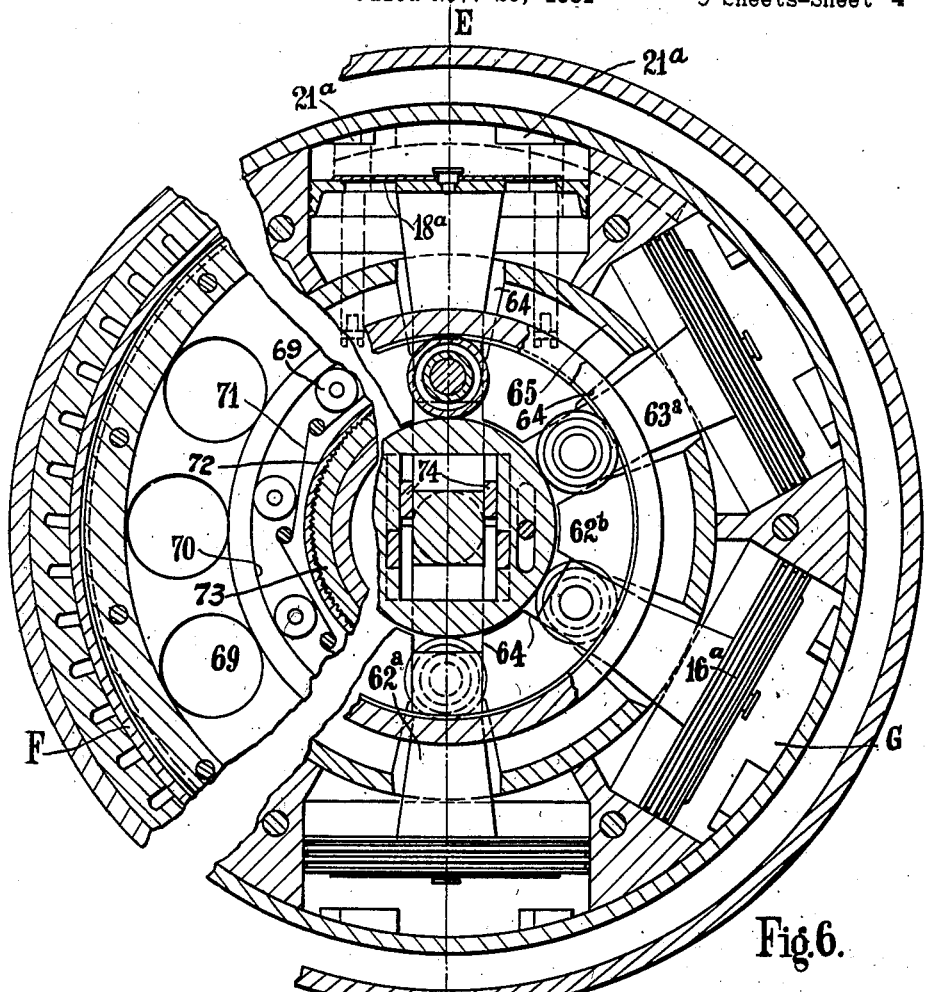
Figure 6 is a part sectional end elevation of this latter form of gear of which the portions F and G are sections taken respectively on the lines F—F and G—G of Figure 5.
Figure 4:
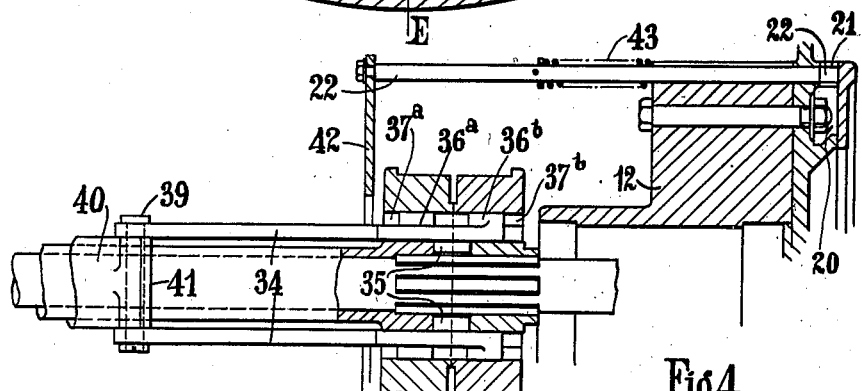
Figure 4 is a sectional plan of a part of the control mechanism for this form of gear.

In carrying the invention into effect in one convenient manner as illustrated in Figures 1 to 4 the gear comprises a driving shaft 1, a following shaft 2 and a casing 3. The driving shaft 1 carries a pair of oppositely adjustable discs, 4a and 4b through the medium of flanges 5, the latter being securely attached to the driving shaft 1 and being radially keyed to the discs 4a and 4b so as to transmit the drive from the main shaft 1. The said discs 4a and 4b carry rings 6a and 6b mounted thereupon by ball bearings 7. These rings are provided with grooves 8 accommodating alternately the ends 9 of bell crank levers 10a and 10b, the ends 9 being made spherical to allow of universal relative movement between the cranks 10 and rings 6a, 6b. The said bell cranks are pivoted at 11a, 11b to a cylinder block 12 and are connected by pins 13 and 14 and connecting rods 15 to pistons 16 operative in axially arranged bores 17 formed in the cylinder block 12. The closed ends of the cylinders 17 are provided with ports controlled by non-return suction and delivery valves 18, 19. The delivery valves 19 open into a common chamber 20. The chamber 20 which thus receives fluid under pressure from all the cylinders is provided with a series of openings or jets 21 under the control of sliding valve rods 22 (see Fig. 4).

Immediately adjacent to the jets 21 is a series of vane rings 23, 24, 25, of which the first ring 23 is attached to a flange 26 which is rotatably mounted on the main casing 3 and is provided with dogs 27, 28. The second ring 24 is attached to the cylinder block 12, which block is further provided with dogs 29. The outer vane ring 25 is attached to a ring or sleeve 30 which is slidably keyed to the main casing, a key 31 being provided and is further provided with two sets of dogs 32, 33 corresponding to the dogs 27 and 29 respectively.

Adjustment of the discs 4a, 4b is effected by levers 34 pivoted at 35 to the driving shaft 1 and having pins 36a and 36b engaging appropriate slots 37a, 37b in the respective discs 4a and 4b. The levers 34 extend away from the cylinder block 12 and are provided with slots 38 which engage with a pin 39 carried by a sleeve 40 slidably mounted on the driving shaft 1. The slots 38 are so arranged that the first part of a movement of the sleeve 40 in a direction towards the cylinder block causes the levers 34 with the pins 36 to turn from the position x shown in Figure 1 to the position y. Continued motion of the sleeve 40 will then impart no further movement to the levers 34. During this further motion a flange 41 formed integrally with the sleeve 40 engages the face of a disc 42 to which disc the jet valve rods 22 are attached and thus moves these valve rods against return springs 43 so as to close the jet openings 21. According to the foregoing arrangement the control first effects full eccentric adjustment which then remains constant whilst the gradual closing of the jet openings takes place. The movement of the sleeve 40 is effected by levers 44 having pins 45 which engage a groove 46 in a flange 47 rotatably mounted by the ball bearing 48 on the sleeve 40.

The mechanism is shown in neutral position and ready for forward drive, thus the eccentric discs 4a, 4b are adjusted to their positions of zero eccentricity and the jets 21 are fully open whilst the vane rings 23 and 25 are coupled non-rotatably to the casing. The cylinder block is coupled to the following shaft 2 through the dogs 49 engaging with dogs 50 carried by a sleeve 51 slidably splined upon the following shaft 2.

A reverse drive is secured by the provision of a lever 52 secured to an operating shaft 53 rotatably mounted in the casing, one end of which lever is operatively connected to the sleeve 51 by a pin 54 engaging in a groove 55 formed in the said sleeve 51 while the other end of the lever is connected to the outer vane ring sleeve 30 through the medium of a pin 56, a rod 57 and a disc 58. On operation of this lever the sleeve 30 is moved to disengage the dogs 32 and 27 and to engage the dogs 29 and 33 while simultaneously the sleeve 51 is moved to disengage the dogs 49 and 50 and engage the dogs 50 carried thereby with the dogs 28 carried by the flange 26. By this means the cylinder block 12 is clutched to the casing 3, the outer vane ring 25 becoming inoperative while the inner vane ring 24 is clutched to the following shaft 2 and a reverse drive results therefrom as will presently be described. In an alternative arrangement (not illustrated) the outer vane ring 25 is attached to the flange 26 instead of to the ring 30 so that it remains always in operation.

The operation of the gear is generally similar to the operation of the gears described in the prior British patent specification No. 352,034. Thus, commencing with the driving shaft rotating and with the gear in its neutral condition, i. e. with the eccentric discs 4a, 4b adjusted to zero eccentricity and the jets 21 fully open, operation of the control levers 34 will impart an eccentricity to the discs 4a, 4b as a result of which the pistons 16 will be reciprocated in the cylinder 17. Oil, or other working fluid with which the casing has previously been filled, will thereby be entrained through the suction valves 18 and discharged through the delivery valves 19 into the common pressure chamber 20 from which it issues through the jets 21 and impinges on the vane rings 23, 24 and 25 thus imparting a rotating torque to the cylinder block. By the use of the automatic suction and delivery valves in conjunction with the common pressure chamber aforesaid a substantially continuous discharge is obtained from the jets 21. These features constitute important improvements upon the method of fluid circulation adopted in the gears described in the prior specification already referred to. Other important improvements are the use of a multiplicity of vane rings connected alternately to fixed and moving parts and their formation so as to compel the working fluid to take a sinuous path in its passage through them. The vanes themselves are each formed so as to deflect the stream of working fluid through an angle of 180° or substantially so. By the above features it is possible to utilize the kinetic energy of the working fluid with greatly enhanced efficiency.

Further adjustment of the levers 34 having moved the eccentric discs 4a—4b to their positions of maximum eccentricity the jets 21 are progressively closed by the valves 22 until circulation of working fluid is completely stopped when a direct drive results.

As in the previous gears, the torque transmitted to the following shaft in forward gear is both static and "dynamic", the latter being a minimum at low and a maximum at high velocity ratios. In reverse gear, however, the torque transmitted is purely dynamic, being that due to the dynamic pressure of the fluid on the vane ring 23 (and also the vane ring 25 in the alternative arrangement), the cylinder block being held stationary in this instance.

Referring to the form of gear illustrated in Figures 5 to 8 this comprises a driving shaft 1a here shown coupled directly to an eccentric shaft 59 carrying a pair of oppositely adjustable discs 4c and 4d, the first said disc being formed in two parts accommodating the latter midway between them. The discs are mounted between and are radially keyed to flanges 5a formed with the eccentric shaft 59, spacing flanges 60 being interposed between the said flanges and discs. Bearing against these discs are rollers 61a and 61b alternately attached to extensions 62a, 62b of pistons 16a. Surrounding these rollers are keep rings 63a and 63b which retain the rollers in bearing upon their respective discs. The said extensions 62a, 62b of the pistons are constrained in radially disposed guideways 64 formed in a frame 65 secured to a cylinder block 12a.

It will be noted that the constructional arrangement just described permits of the cylinder axes being coplanar thus eliminating unbalanced couples which may otherwise arise either dynamically or statically Non-return suction valves 18a are fitted to the heads of the several pistons 16a and jet openings 21a are provided at the outer or closed ends of the cylinders, these openings being controllable by means of sliding valve rods 22a. These rods are provided with enlarged ends and seal or leakproof washers 66 are fitted thereto. Immediately adjacent to the port or jet openings is a series of vane rings 23a, 24a, 25a. Of these the intermediate vane ring 24a is attached to a shroud or extension 67 of the cylinder block 12a, while the other vane rings 23a and 25a are connected through the medium of a flange 68 and a free wheel hub to the casing 3a. The said hub is arranged to provide free rotation in a forward direction while resisting rotation in a reverse direction and comprises rollers 69 disposed between a bore 70 in the flange member 68 and inclined planes 71 formed on a member 72 attached to an extension 73 of the casing 3a.

Adjustment of the discs 4c, 4d is effected by means of sliding cams or wedge-strips 74 which engage corresponding slots in the said discs. These strips are carried at their ends by collars 75, 76 slidably mounted on the shaft 59. A ring 77 rotatably mounted on the collar 75 by means of the ball race 78 is formed with pins 79 which engage cam slots 80 formed in a sleeve 81 rotatably mounted in the casing extension 73.

Figure 5:
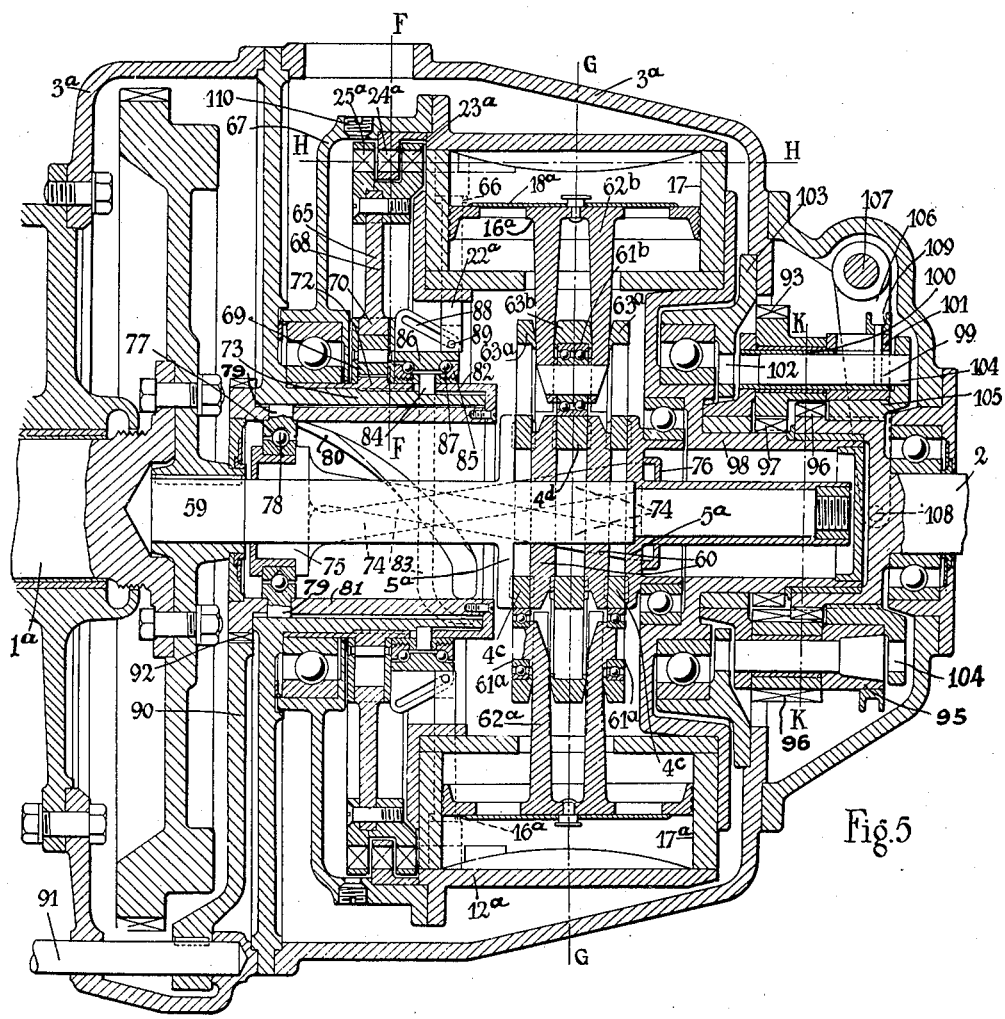
Figure 5 is a sectional side elevation of another form of gear according to the invention taken on the line E—E of Figure 6.
Figure 10:
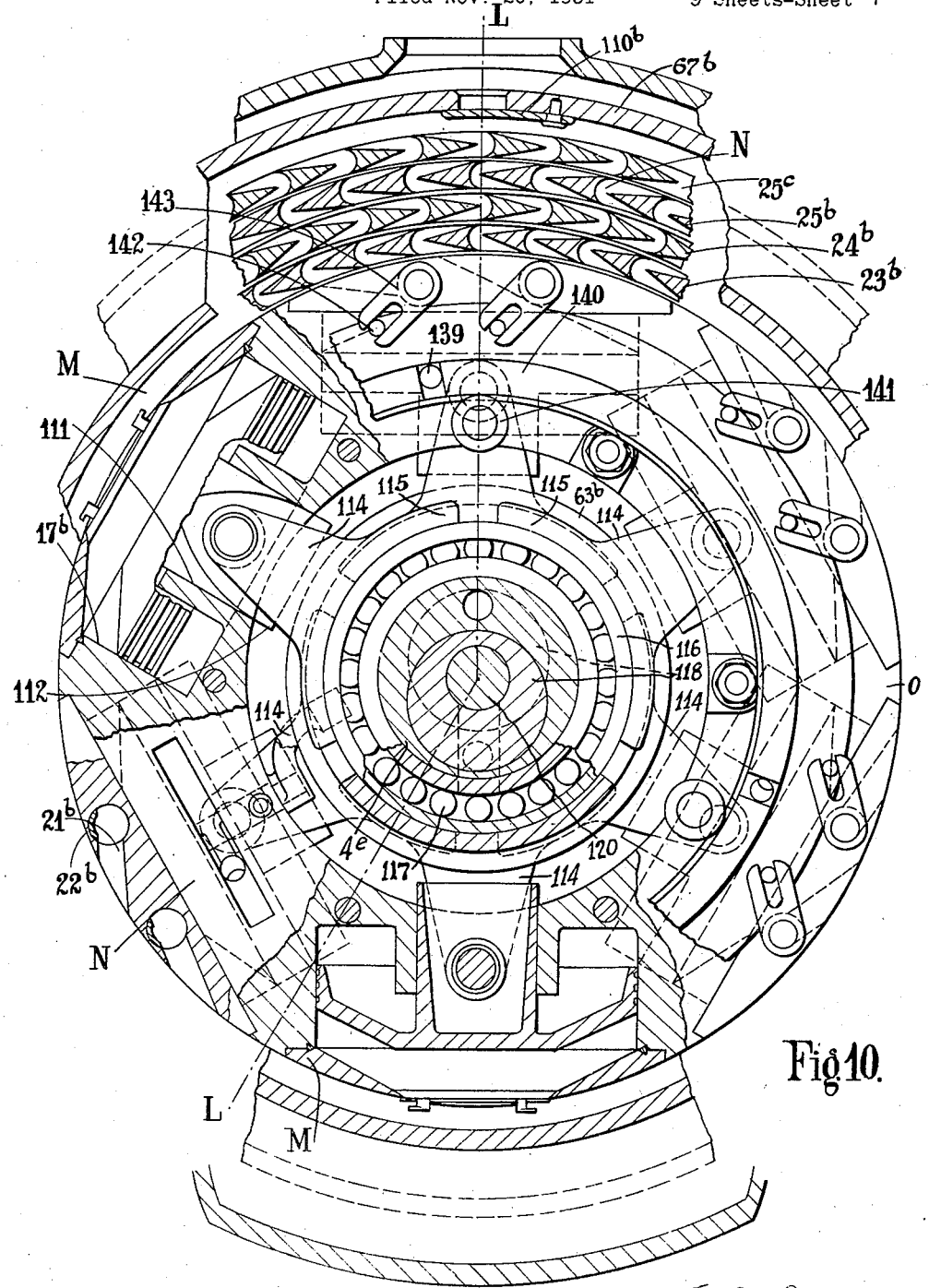
Figure 10 is a part sectional end elevation of this last form of gear of which the portions M and N are sections respectively on the lines M—M, N—N of Figure 9 while the portion O is an end elevation of a cylinder block which forms part of the gear.
Figure 15:
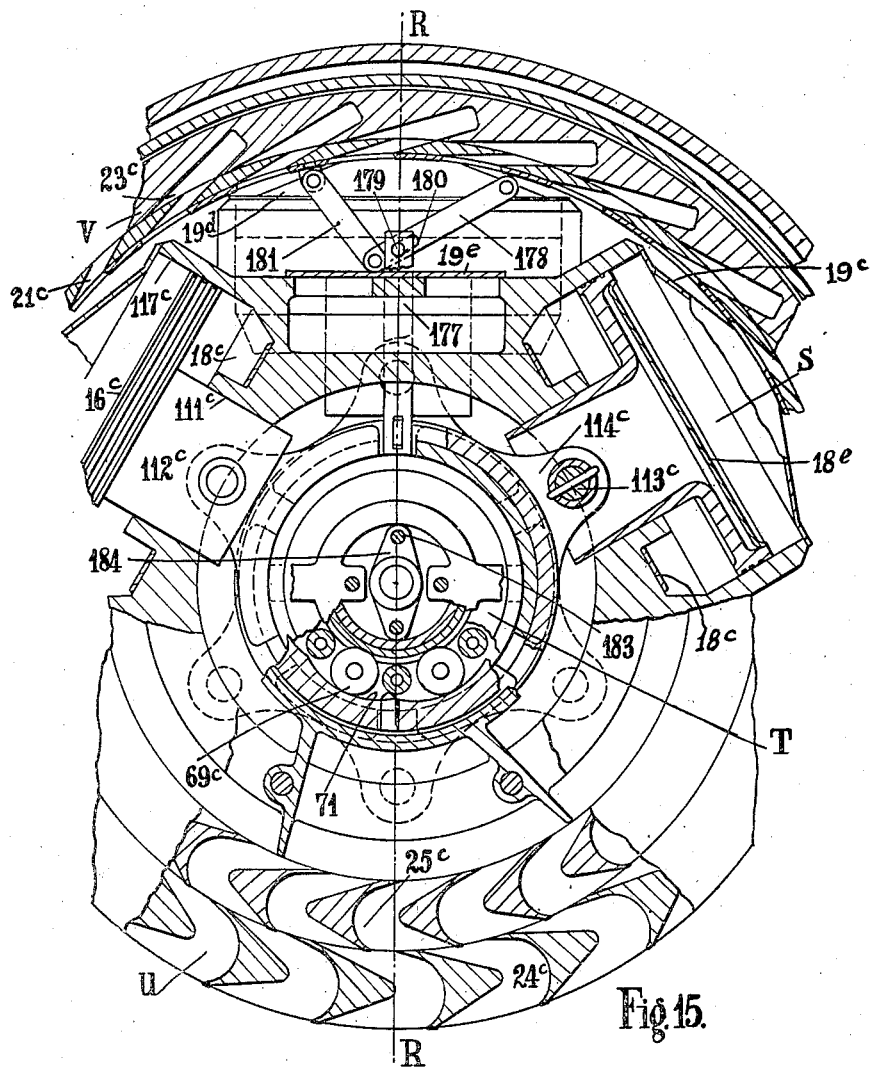
Figure 15 is a sectional end elevation of this further form of gear of which the portions S, T, U and V are sections taken respectively on the line S—S, T—T and U—U, V—V, of Figure 14.
Figures 16, 17:
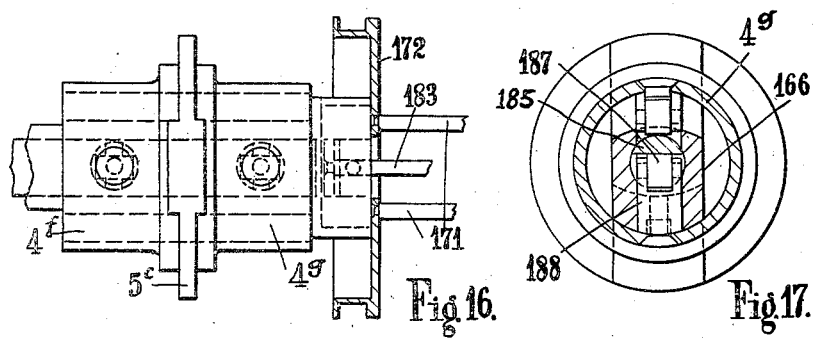
Figures 16 and 17 are respectively, a part sectional plan and an end elevation, of which Figure 17 only is a section, taken on the line W—W of Figure 14, of a portion of control mechanism embodied in this further form of gear according to the invention.

Another sleeve 82 secured to the sleeve 81 is provided with cam slots 83 and these slots engage pins 84 attached to a sliding collar 85 on which a ring 86 is rotatably mounted by a ball bearing 87. The said ring is provided with inclined grooves or slots 88 engaging pins 89 attached to the jet valve rods 22a. Rotation of the sleeve 81 is effected by a toothed quadrant 90 attached to an operating shaft 91 rotatably mounted in the casing, which quadrant meshes with teeth 92 formed on the sleeve 81. The cam slots 80 and 83 are formed, as shown in Figure 5, with helical and circumferential portions so arranged as initially to impart axial motion to the collar 75 whilst collar 85 is stationary and during the further rotation collar 75 remains stationary whilst axial motion is imparted to collar 85. Thus the operation of the control gear first effects eccentric adjustment whilst the latter part effects a gradual closing of the jet openings.

A reverse drive is secured by the provision of an epicyclic reverse gear mechanism which comprises intermeshing pinions 93, 94 rotatably carried by a housing 95 which is itself rotatably mounted within the casing 3a. The pinion 94 meshes with teeth 96 formed on an extension of the following shaft 2a while the pinion 93 meshes with teeth 97 formed on a sleeve member 98 secured to the cylinder block 12a. Pins 99 which pass through hollow journals 100 carrying the said pinions can be moved by a sliding collar 101 to engage either holes 102 formed in a member 103 attached to the casing 3a of the gear or holes 104 in a member 105 secured to the following shaft. In the former case the housing 95 is held stationary so that a reverse drive results, while in the latter case the epicyclic train is locked, producing direct or forward drive. Operation of the collar 101 is effected by levers 106 secured to an operating shaft 107 and having pins 108 which engage with a groove 109 formed in the periphery of the collar 101.

Operation of the gear resembles that of the example previously described except as regards the free wheel attachment of the vane rings 23a, 25a, in the omission of a pressure chamber and non-return delivery valves and in the provision of a mechanical reverse gear. An improvement provided in this case is the enclosure of the circulatory system by the shroud 67. By this means the working fluid is caused to circulate over the shortest possible path and fluid friction which would result from its presence in the casing 3a is prevented. Filling apertures 110 are provided in the shroud 67 for the introduction of working fluid.

The free wheel attachment of the vanes 23a and 25a provides that when these latter are ineffective, i. e. at low velocity ratios, or in the region of direct drive, they shall rotate with the cylinder block without imposing any frictional resistance to its rotation.

Referring to the form of gear illustrated in Figures 9 to 13, this comprises a driving shaft 1b which carries a cylinder block 12b which may in the case of an engine conveniently constitute the flywheel. The block 12b is provided with a series of radially disposed bores having each a large diameter 17b and a reduced diameter 111. These bores accommodate truncated pistons 16b having skirts 112 constituting guides and carrying gudgeon pins 113. These pins are attached to connecting rods 114 having circularly formed portions 115 encircled by keep rings 63b and bearing segmentally upon rings 116 mounted by roller bearings 117 upon adjustable discs 4e. The said discs have eccentric bores which fit eccentrics 118 oppositely formed upon a central shaft or sleeve 119. These eccentrics are disposed between two flanges 5b, both of which are securely attached to a central intermediate shaft 120. The discs 4e are further constrained by pin keys 121 which engage diametrically opposed keyways 122 or slots in the flanges, 5b. One flange 5b extends in the form of a sleeve 123 along the shaft 120 and is coupled thereto at the end of this sleeve. It is also coupled to the end of a further shaft 124 in such a manner as to leave several open castellations 125 to accommodate a sliding part 126 described later. The form of inter-coupling is clearly illustrated in Figure 13.

The eccentric adjustment is effected by rotation of the eccentrics 118 and this rotation is produced by a sleeve 128 having a quick pitch screw thread and slidably keyed to the eccentric sleeve 119. This screw is operated by a slidable nut 129 formed integrally with the sliding part 126 previously mentioned which passes through the open castellations 125 and is thus free to slide but not rotate relative to the sleeve 124. Axial motion of the sliding part 126 and nut 129 will thus impart rotary motion to the sleeve 128. As the nut 129 continues to move forward, the sleeve 128 having made a predetermined rotation (180° in this case), projections on the sleeve 128 in the form of a key part 130$a$ and a flat part 130$b$ (Figure 12) register with corresponding keyway 131$a$ and a flat 131$b$ formed on the shaft 120 and engage therewith. The engagement of these male and female parts prevents further revolution of the sleeve 128 but allows it to move axially forward with the nut 129, at which point, full eccentric adjustment having been effected which thereafter remains constant, the sleeve 128 carries forward pins 132 which latter engage a groove 133 in the said sleeve. These pins are secured to a sliding collar 133$a$ upon which a ring 134 is rotatably mounted by a ball bearing 134$a$. Spindles 135 rotatably mounted in the cylinder block 12$b$ carry cranked pins 136 which engage a groove 137 formed in the ring 134 and levers 138 having ball ends 139 which engage an annulus 140 rotatably mounted on the face of the cylinder block 12$b$ by rollers 141. The annulus 140 is provided with pins 142 which engage slotted levers 143 carried by rotary jet control valves 22$b$, the arrangement being such that axial movement of the ring 134 will through the medium of the spindles 135 and annulus 140 transmit rotary movement to the rotary valves 22$b$.

The cylinders are provided with inlet valves 18$b$ and with adjustable port openings 21$b$, the adjustment being effected by rotatable valves 22$b$. The cylinder block is provided with suitable cowlings or sub casings 67 and 67$b$ thus forming an enclosed system for the working fluid. Filling may be effected by a plug or push in non-return valve 110$b$.

Immediately adjacent the jet openings is a series of vanes 23$b$, 24$b$, 25$b$ and 25$c$. The vanes 23$b$ and 25$b$ are attached to the sleeve 124 through the medium of a disc 144 and the sleeve 123 whilst the vanes 24$b$ and 25$c$ are attached to a disc 145 secured to an extension of the casing.

The axial movement of the said sliding part 126 is effected by control levers 146 secured to a control spindle 147 and having pins 148 which engage in a groove 149 formed in a ring 150, this ring being rotatably mounted on a collar 151, attached to the sliding part 126 by a ball bearing 152.

A reverse gear mechanism is provided which comprises planet pinions 153 rotatably carried in a housing 154 which is itself mounted for rotation about the sleeve 124. An annular wheel 155 secured to the following shaft 2$b$ is provided with teeth 156 which engage the pinions 153 and is formed on its outer surface with spline dogs 157. Corresponding splines 158 are formed on the outer surface of the housing 154 and a ring 159 is slidably mounted thereon. This ring 159, which may be moved axially by the operation of levers 160, secured to an operating shaft 161 and having pins 162 engaging therewith in a groove 163, is provided with dogs 164 adapted to engage dogs 165 secured to the casing 3$b$. The arrangement is such that the ring 159 may be moved either to clutch the annular wheel 155 to the housing 154 in which case the train is locked and a direct drive results or it may be moved to clutch the housing 154 to the casing to produce a reverse drive.

The operation of the gear is generally similar to that of the example first described except that no free wheel attachment for the vanes is included. Actuation of the control lever 146 first effects, as in the previous instance, the adjustment of the eccentric stroke, this being followed by closure of the jets.

Referring to the form of gear illustrated in Figures 14 to 17, an eccentric carrier shaft 166 secured through the medium of a member 167 to the driving shaft 1$c$ carries a pair of oppositely adjustable eccentrics 4$f$, 4$g$ between flanges 5$c$. Rings 116 are rotatably mounted on the eccentrics by ball bearings 47$c$ and are engaged by slipper connecting rods 114$c$ which are retained in place thereupon by keep rings 63$c$. The connecting rods 114$c$ are attached by gudgeon pins 113$c$ to the skirts 112$c$ of piston 16$c$ arranged to reciprocate in bores 117$c$ formed in a cylinder block 12$c$ rotatably mounted within the casing 3$c$ of the gear. The piston skirts 112$c$ reciprocate in bores 111$c$ formed in the cylinder block 12$c$ and by this means a double acting piston construction is secured.

Non-return valves 18$c$, on the cylinder block, and non-return valves 18$d$, 18$e$ on the heads of the pistons serve as suction valves admitting working fluid respectively to the cylinders and to the annular spaces between the bores 117$c$ and 111$c$. The valves 18$c$ are retained on their seats by springs 18$f$, which latter are anchored by pins 18$g$. Similarly non-return delivery valves 19$c$, 19$d$ and 19$e$ admit working fluid from the said annular spaces and cylinders into a common pressure chamber 20$c$. Working fluid issues from the chamber 20$c$ through jets 21$c$ under the control of a valve 22$c$ which takes the form of a ported ring surrounding the cylinder block and rotatably mounted thereon. The issuing fluid impinges upon vane rings 23$c$, 24$c$ and 25$c$ of which the rings 23$c$ and 25$c$ are carried by a member 67$c$ rotatably mounted in the casing 3$c$ upon a free wheel clutch comprising rollers 69$c$ engaging therewith in arcuately relieved portions 71$c$, while the vane ring 24$c$ is secured to the cylinder block. The vanes comprising the ring 23$c$ are constructed so as to deflect the issuing fluid jet both radially and tangentially so as to direct it radially inwards towards the vane rings 24$c$ and 25$c$.

Adjustment of the valve 22$c$ is effected from axial movement of a ring 168 slidably mounted on a shaft 169 secured to the cylinder block 12$c$ through the medium of a member 170 formed integrally with the said shaft. This ring is connected by rods 171 (Figure 16) to another ring 172 slidably mounted on an extension 173 of the member 170 and having a groove 174 which engages one arm of a bell crank 175. The other arm of the said bell crank engages a groove 176 in a plunger 177 slidably mounted on the cylinder block 12$c$ and connected at its outer extremity to a toggle link 178 through a pin 179 and slot 180. The toggle link 178 is pivoted at one end to the cylinder block 12$c$ and at the other to a link 181 which is pivoted to the valve 22$c$, the arrangement being such that an axial movement of the plunger 177 will, through the medium of the links 178, 181, impart a rotary movement to the valve 22$c$.

Adjustment of the eccentrics 4$f$, 4$g$ is effected from axial movement of a ring 182 similar to the previously mentioned ring 168 which is connected through the medium of rods 183 and a thrust collar 184 to a cam member 185. Inclined surfaces 186 formed on the member 185 engage rollers 187 carried by plungers 188 which pass through and slide in bores in the eccentric carrier shaft 166 and are secured to the eccentrics 4f, 4g. By this arrangement axial movement of the cam 185 will impart opposite eccentricities to the said eccentrics.

These adjustments are effected from a common operating shaft 189 which carries a cam plate 190 having grooves 191, 192 formed therein. Levers 193, 194 pivotally mounted in the casing have pins 195, 196 at one end of each lever which engage in the said grooves and pins 197, 198 at the other ends of the levers which engage respectively grooves 199, 200 formed in rings 201, 202 rotatably mounted on the rings 182, 168. The grooves 191, 192 in the cam plate 190 are so shaped that, at first, during rotation of this plate on its operating spindle, the lever 193 is operated to adjust the eccentrics while the lever 194 remains stationary, then, when the eccentrics have received full adjustment, the lever 194 is operated to close the valves while the lever 193 remains stationary.

A reverse gear is provided which is substantially identical with that already described in connection with the form of gear illustrated in Figures 9 to 13.

The operation of the gear is similar to that of the examples previously described except that the working fluid is circulated by double acting pistons.

It is to be understood that the invention is not limited to the above details but is capable of being variously modified to suit any practical requirements or conditions it may be desired to fulfil.

Having now described my invention, what I claim as new and desire to secure by Letters Patent is:—

1. In a hydraulic variable transmission mechanism, a driving shaft and a driven shaft, an outer casing for the mechanism and within which is a circulating fluid, pumping means operated by the driving shaft to circulate the fluid, including two discs relatively adjustable to vary the rate of flow of the fluid, a first ring having vanes past which the fluid is passed from the pump, means whereby this first ring may be allowed to rotate freely in one direction or be clutched to the casing to resist rotation in the opposite direction and a second vane ring connected to revolve with the driven shaft and having its vanes reversed in relation to the vanes of the first ring from which latter vanes the fluid passes to the vanes of the second ring.

2. A continuously variable hydraulic transmission gear comprising in combination a driving shaft, a driven shaft, a casing adapted to contain the working fluid, a hydraulic pump comprising pistons adapted to be reciprocated to a variable extent by said driving shaft and cylinders carried by the driven shaft and in which cylinders said pistons reciprocate to project the working fluid from the cylinders, a common chamber into which the fluid is delivered from the cylinders, jet outlets in the common chamber through which the fluid in this chamber is projected, by the action of the pistons, valves adapted to permit of the flow of the working fluid into said cylinders and common chamber, means for varying the size of said jet outlets from zero to a maximum so that the circulating fluid may transmit a driving torque by static reaction and by dynamic reaction, or by static reaction alone (when the size of the jet outlets is zero), a first series of vane members arranged to be traversed by the fluid projected from said jet outlets, means whereby these vanes may be fixed to the casing, a second series of vane members carried by said cylinders and arranged to be traversed by the fluid delivered from said first vane members, a third series of vane members arranged to be traversed by the fluid delivered from said second series of vane members and means whereby said third series of vanes may be fixed to the casing.

3. A continuously variable hydraulic transmission gear according to claim 2 wherein each cylinder is provided with a non-return suction and delivery valve, the former valves opening to the casing so that the working fluid may flow therefrom to the cylinders, and the latter valves opening to said common chamber so that fluid under pressure may be received in this chamber from all the cylinders.

4. A continuously variable hydraulic transmission gear according to claim 2 wherein the vanes of successive series are formed so as to turn the fluid in opposite directions.

5. A continuously variable hydraulic transmission gear according to claim 2 wherein said third series of vanes are formed so as to give the fluid a forward component in the same direction as the rotation of the cylinders.

6. A continuously variable hydraulic transmission gear according to claim 2 comprising means for clutching the cylinders to the casing and means for clutching the first mentioned series of vanes to the driven shaft so as to secure a reverse drive, in which the torque transmitted is purely dynamic, being that due to the dynamic pressure of the fluid on the said first series of vane members.

7. A continuously variable hydraulic transmission gear according to claim 2 wherein the means for varying the stroke of the pistons and for controlling the size of said jet outlets are interconnected and in such manner that first full stroke adjustment is effected which then remains constant while adjustment of the size of the jet outlets takes place.

8. A variable hydraulic transmission gear comprising in combination a driving shaft, a driven shaft, a plurality of cylinders and pistons for operation therein and connections between the cylinders and pistons and the two said shafts circulating the working fluid, means whereby the stroke of the pistons may be varied so that the quantity of fluid circulated may also be varied, said cylinders having outlets which are capable of adjustment, a plurality of vanes disposed adjacently to the said outlets including vanes connected with the driven shaft and stationary reaction vanes, said vanes serving to assist in the creation of dynamic torque between the driving and driven shafts from the kinetic energy of the working fluid, and a common chamber between the cylinder outlets and the vanes into which chamber the fluid is delivered from the cylinders before being delivered to the vanes.

9. A continuously variable hydraulic transmission gear comprising in combination, a driving shaft and a driven shaft, a plurality of pistons carried by said driving shaft and cylinders, for said pistons, carried by the driven shaft, a casing enclosing said cylinders to form a closed circuit in which the fluid may circulate and said cylinders having adjustable ports through which the circulating fluid is passed, means on said driving shaft adapted to reciprocate said pistons within their cylinders so as to circulate the operating fluid, said means being adjustable so as to vary the stroke of the pistons, stationary reaction means for receiving the fluid discharged from said cylinder ports to aid in the imparting of dynamic torque to the driven shaft, vanes on the driven shaft for receiving the fluid delivered past the stationary reaction means, and a common chamber between the cylinder outlets and the reaction means for receiving the fluid delivered from the cylinders before it passes to the reaction means.

10. A variable hydraulic transmission gear including a driving and a driven shaft, a revoluble cylinder block and cylinders therein, pistons in the cylinders and connections from said block and pistons to said shafts for circulating the fluid, fixed reaction means for receiving the fluid discharged from the cylinders, vanes on the driven shaft for receiving the fluid delivered past the fixed reaction means, means for changing the direction of discharge of the fluid from the cylinders whereby the discharge reaction against the cylinders will tend to cause the cylinder block to revolve in different directions in the gear, and a common chamber between the cylinder outlets and the reaction means for receiving the fluid before it passes to the reaction means.

JESSE BEDFORD.